United States Patent
Leibbrandt et al.

(10) Patent No.: US 8,123,659 B2
(45) Date of Patent: Feb. 28, 2012

(54) METHOD FOR PREVENTING UNCONTROLLED ROLLBACK

(75) Inventors: Martin Leibbrandt, Bedburg (DE); Harald Schmitz, Dortmund (DE)

(73) Assignee: Getrag Ford Transmissions GmbH, Cologne (DE)

( * ) Notice: Subject to any disclaimer, the term of this patent is extended or adjusted under 35 U.S.C. 154(b) by 597 days.

(21) Appl. No.: 12/261,845

(22) Filed: Oct. 30, 2008

(65) Prior Publication Data

US 2009/0127012 A1 May 21, 2009

(30) Foreign Application Priority Data

Nov. 16, 2007 (DE) .......................... 10 2007 055 085

(51) Int. Cl.
*B60W 10/02* (2006.01)
*B60W 10/04* (2006.01)
*B60K 28/12* (2006.01)

(52) U.S. Cl. .................... 477/175; 477/183; 180/282

(58) Field of Classification Search .................. 477/93, 477/171, 174, 175, 176, 180, 181, 183, 203, 477/901; 180/271, 272, 282
See application file for complete search history.

(56) References Cited

U.S. PATENT DOCUMENTS

| | | | | |
|---|---|---|---|---|
| 5,376,869 A * | 12/1994 | Konrad | .......................... | 318/587 |
| 6,321,144 B1 * | 11/2001 | Crombez | .......................... | 701/22 |
| 7,041,031 B2 * | 5/2006 | Wheeler et al. | ................ | 477/110 |
| 7,226,389 B2 * | 6/2007 | Steen et al. | .................... | 477/195 |
| 7,833,127 B2 * | 11/2010 | Petzold et al. | .................. | 477/97 |
| 2002/0065170 A1 * | 5/2002 | Suzuki | .......................... | 477/171 |
| 2007/0111856 A1 * | 5/2007 | Jiang et al. | .................... | 477/174 |
| 2009/0062061 A1 * | 3/2009 | Silveri et al. | ..................... | 477/5 |

FOREIGN PATENT DOCUMENTS

| | | |
|---|---|---|
| DE | 35 34 675 | 9/1987 |
| DE | 197 33 465 | 2/1998 |
| DE | 198 49 494 | 3/2000 |
| DE | 199 10 573 | 9/2000 |
| DE | 102 39 392 | 3/2004 |
| DE | 10 2004 017 635 | 10/2005 |
| EP | 1 630 054 | 3/2006 |

* cited by examiner

*Primary Examiner* — Roger Pang

(74) *Attorney, Agent, or Firm* — Schlee IP International, P.C.; Alexander R. Schlee

(57) ABSTRACT

A method and a motor vehicle applying that method for preventing an uncontrolled rollback of a motor vehicle is suggested, said method comprising means for influencing the torque transmission by a drive train. In case a rollback action is detected, namely a movement in opposite direction as the predetermined direction of movement, the transmission of torque is influenced such that a torque is transmitted via the drive train acting against the rollback direction and the torque does not exceed a defined maximum value. The control allows a controlled rollback by making the intervention by the system to be perceived little disturbing, but at the same time in particular in case of strong incline of the road does not render the driver non-informed about the actual incline.

10 Claims, 1 Drawing Sheet

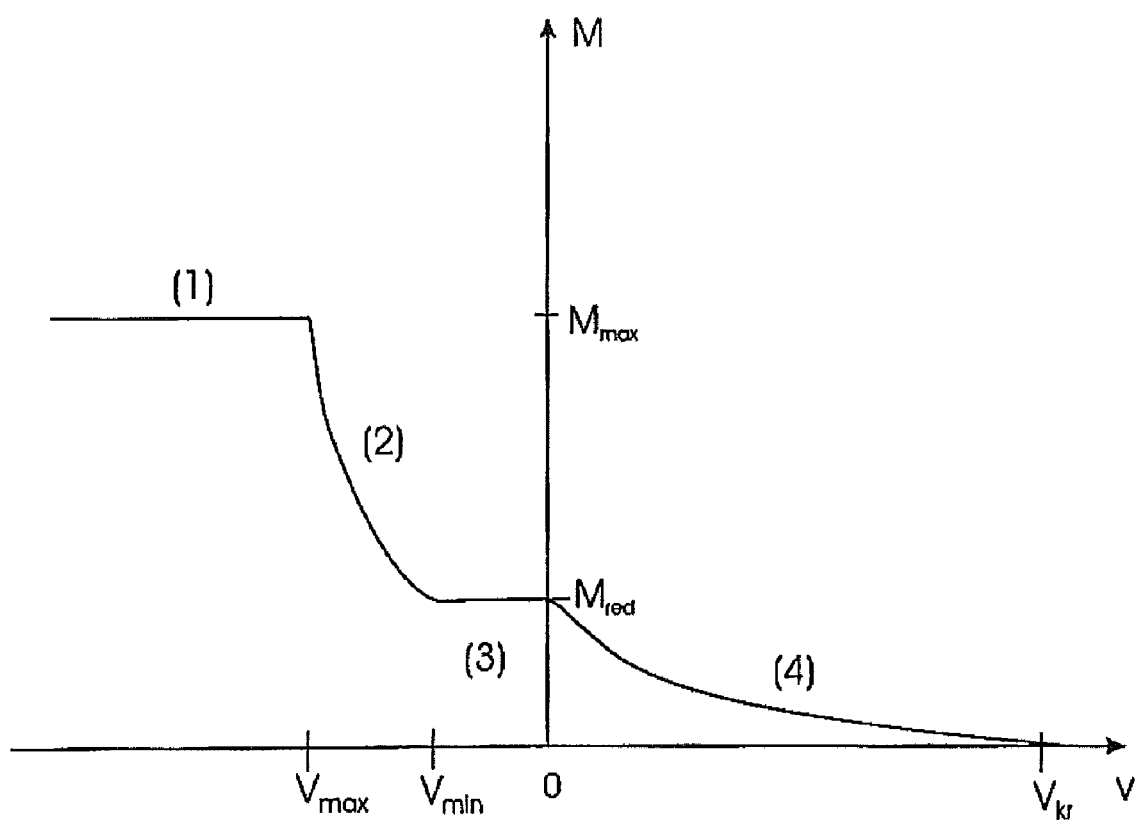

METHOD FOR PREVENTING UNCONTROLLED ROLLBACK

CROSS REFERENCE TO RELATED APPLICATION

This application claims the priority right from the German patent application DE 102007055085.7 that was filed on Nov. 16, 2007, the content of which is herewith incorporated in its entirety by reference.

BACKGROUND OF THE INVENTION

The invention relates to a method for preventing an uncontrolled rollback of a vehicle with released brake by influencing the toque transmission through the drive train between a motor and at least one driven wheel as well as vehicle equipped accordingly. For example, influencing the torque transmission is accomplished by controlling engagement of at least one clutch or its actuators. In case a rollback status is determined, i.e. a movement in opposite direction as the predetermined direction of the motor vehicle is determined, a means for influencing the torque transmission, i.e. for example the clutch, is controlled such that the drive train creates a torque that acts against the rollback movement.

Various methods are known attempting by means of superimposing a torque to reduce rollback to zero, i.e. a movement of the vehicle with released brake in the direction opposite to the desired direction. For instance, in typical automatic transmissions the torque converter transmits a drive torque when a drive forward mode is chosen. This torque can be chosen such that the motor vehicle at any incline can hold the vehicle in place even without using the brake or increasing the rotational speed of the motor. Frequently, these properties are perceived as very comfortable. Therefore, suggestions are known preventing a rollback at a variety of possible inclines. In this connection, it is for instance pointed to DE 10239392A1, DE 102004017635A1 and DE 19910573A1. The latter discloses for example the possibility to prevent rollback of a vehicle having a dual clutch transmission. It has been found that the goal that is to be accomplished, namely zero movement of the vehicle, cannot or hardly can be achieved due to measurement tolerances of the speed sensors as well as a lack of ability to determine all drive parameters, as the present incline of the road, and in addition the inconsistent results in the driving reactions makes the driver insecure.

All suggestions as described above have in common that a possible rollback can be prevented entirely. However, under some driving conditions occurring in practical use, a rollback might be desirable, for example a driving maneuver without complicated and time consuming change of the transmission mode.

From the DE 198 49 494 C1 it is known in an almost standstill state of a vehicle to allow a rolling speed in opposite direction to the desired driving direction wherein the rolling speed is limited to a predetermined speed. The limit is accomplished by the predetermined speed by means of braking, influencing the motor speed and/or influencing the torque transmission through the drive train. According to the teaching according to DE 198 49 494 C1 zero movement of the vehicle is prevented for giving the driver the perception of the actual road parameters and to urge the driver to take additional measures preventing the continued movement opposite to the desired driving direction, as for example actuating the brake. By controlling the rolling speed to a definite speed even in case of strongly inclined roads a high load results for the vehicle systems, in particular for the systems involved in the transmission of torque, such as torque converter or clutches. Even though this problem has been addressed in DE 198 49 494 C1, as a solution, limiting the rolling distance has been suggested by braking the vehicle and urging the driver to a new start. This can be very irritating for the driver since he might perceive this as depriving him of the control over the vehicle and can result in incorrect reactions by the surprised driver. Further, the driver will probably not get a chance to get used to this since such automatic action will only occur very infrequently.

SUMMARY OF THE INVENTION

It is therefore an object of the invention to create a method for preventing an uncontrolled rollback of a motor vehicle by influencing the torque transmission by the drive train, but allowing a controlled rollback and by making the intervention by the system to be perceived little disturbing, and in particular in case of strong incline of the road does not render the driver non-informed about the actual incline. This object is achieved by a method and a vehicle applying said method for preventing an uncontrolled rollback of a motor vehicle, said method comprising means for influencing the torque transmission by a drive train; wherein in case a rollback is detected—a movement in opposite direction as the predetermined direction of movement—the transmission of torque is influenced such that a torque is transmitted via the drive train acting against the rollback direction; and wherein the torque does not exceed a defined maximum value.

The method according to the invention provides that in case a rollback action is detected when the brakes of a vehicle are released, i.e. a movement of the vehicle in opposite direction as the predetermined direction of movement, the torque transmission is influenced such that a torque is transmitted via the drive train acting against the rollback direction so that the rollback acceleration is decreased depending on the incline of the road and or the torque is reduced to zero, and finally accelerates the vehicle into the opposite direction, i.e. into the desired direction of movement. Rollback direction according to the present invention does not necessarily mean the reverse gear driving direction of a vehicle, but is only defined in that it is opposite to the desired direction of traveling that can be forward or reverse, wherein the predetermined or desired direction of movement can for example be determined by the position of the driving mode lever. If for instance the driving mode lever is in a position correlating to a forward movement of the vehicle, the rollback direction would be the reverse direction. If, however, the driving mode lever is in such a position that correlates to the reverse driving direction, the rollback direction would be the forward direction. According to the process according to the invention, the torque that is transmitted through the drive train is finally transmitted to the driving wheels such that a predefined maximum value is not exceeded. Limiting the torque that counteracts the rollback acceleration to a maximum value prevents overload in the drive train, in particular in the means for influencing the means for transmitting torque, in particular the clutch. In addition, this measure is not perceived by the driver as very disrupting since the intervention is relatively soft and can be chosen in accordance with parameters such as vehicle weight and/or road incline. Further, the limitation to a maximum value accomplishes that in case of sufficiently high rollback movement in case of still existing incline of the road is decreased but still accelerates further so that the driver receives a feedback about the actual incline of the road. Not only providing a feeling of direct contact with the surface of the road, but also urges the driver for safety reasons to take other countermeasures, as for example actuating the break. By means of this required intervention by the driver in case of strong rollback action the driver is actively involved as he is used to from conventional systems and is not surprised, and the safety is increased in comparison with methods known from prior art.

According to a preferred embodiment, with increasing rollback speed, i.e. increase in the absolute value of the rollback speed, at least in a controlled partial range of it the torque is continuously increased to a maximum value. The continuous increase of the torque with increasing rollback speed achieves a particularly soft decrease in the rollback acceleration. For controlling at least this partial range various control characteristics are applicable, for example P, I, PI, PD or PID characteristic.

According to a preferred embodiment of the method according to the invention, in a particular range comprising the speed zero (standstill of the vehicle) of the rollback speed a constant, reduced torque in comparison to the maximum value is transmitted via the drive train. For example, in a speed range from zero to a defined minimum rollback speed or 2 km/h that is lower than the minimal rollback speed at which the maximum torque is applied, a reduced torque is transmitted to the driving wheel or plurality of driving wheels. By means of this constant torque that is set independently of the rollback speed in the range of almost standstill, i.e. in the range starting and being about zero, a driving characteristic that is for the most part reproducible is achieved. This results in that the speed sensor that is at present in common use in vehicles does not provide such a fine resolution in the range below 1-2 km/h, e.g. 0.3-0.5 m/s. This results in a non-reproducible driving characteristic in the speed range. Speed sensors with a higher resolution are available, but are comparatively expensive.

Preferably, in case a movement of the vehicle in the predetermined direction of movement is achieved, the reduced torque is controlled down so that a defined creeping speed in the desired direction is not exceeded in case no starting action is present. The triggering of the starting action is for example detected by a change in the gas pedal position. By means of controlling down, an acceleration in the desired direction of movement that irritates the driver is prevented.

According to a further embodiment in case of a further starting desire by the driver the drive train is subjected to a minimum torque calculated from the starting strategy and the torque calculated from the rollback strategy. This allows a supported transition from the creeping speed to the desired direction for starting without decrease in the vehicle acceleration.

According to a further embodiment a further reduced torque in case of applied braking action is applied. For example, in case the operating brake or the parking brake is engaged, a torque is applied that is below the maximum torque and is specific in relation to the road surface properties and/or the incline of the road and is transmitted to the driving wheels for allowing to apply the aforementioned torque more quickly when the brake is released, for example the value of the controlled partial range up to the maximum value for a vehicle with released brakes.

Preferably, releasing of the brake is determined by falling brake pressure. Hence, releasing of the brake can be determined almost immediately after termination of the braking action has been determined. If, however, the braking light switch that is provided as a standard is used, due to its delayed falling characteristics the braking torque can be effective already for some time before the releasing is signaled and the torque has been established.

According to a preferred embodiment the rotational speed of the motor is changed in a predetermined range for influencing the torque. For example, the idle speed can be increased for providing the further reduced torque. The increase can be for example to a set predetermined value when a release of the brake or a rollback action is detected. It can also be set in correlation to the speed or the acceleration, for example calculated from the time that lapsed between the releasing of the brake and the detection of the rollback action. The increase of the idle speed can be limited to a maximum value.

The invention relates further to a motor vehicle with a transmission, means for influencing the torque transmission of a drive train, preferably with at least one controllable clutch in the drive train between motor and at least one driven wheel, and means for detecting the rollback condition. The motor vehicle according to the present invention is characterized by a control for conducting the method according to any of the above described embodiments and accomplishing the related advantages, wherein the vehicle comprises at least one device for increasing the idle rotational speed.

Further, the means for detecting the rollback condition comprise preferably a rotation direction detector. For example it can be the transmission input shaft that operates the reverse gear. This can save a separate sensor, for instance at the driving mode lever, since this input shaft always rotates in the same direction when the driving direction coincides with the desired driving direction.

Preferably, the transmission is an automated shift transmission, an automatic transmission, or a dual clutch transmission.

BRIEF DESCRIPTION OF THE DRAWINGS

Referring to FIG. 1, an embodiment of the invention is described.

DETAILED DESCRIPTION OF THE DRAWINGS

FIG. 1 shows a schematic diagram of the torque M (clutch torque) over the vehicle speed v that is transmitted via the drive train to the driving wheel or the driving wheels of a motor vehicle for counteracting for instance a rollback of the vehicle.

As FIG. 1 shows, in case of a rollback action of the vehicle, ($2^{nd}$ quadrant of the diagram) the maximum value of the torque is limited to a value $M_{max}$ that is reached at the corresponding maximum rollback speed $V_{max}$ and is maintained in case of higher rollback speeds in the range (1). In the controlled partial range (2) the torque depends on the rollback speed V, wherein the torque increases with increasing absolute value of the speed continuously to the maximum value $M_{max}$. In a partial range (3) of a speed from zero up to a rollback speed $V_{min}$ a reduced torque $M_{red} < M_{max}$ is transmitted to the driving wheels, wherein in the speed range (3) the torque is held constant. If starting from the rollback movement due to the applied torque $M_{red}$ a movement into the desired direction is achieved, the torque is regulated down up to reaching a creeping speed $V_{Kr}$ in that direction of movement, i.e. reduced to zero.

The invention claimed is:

1. In a motor vehicle, a method for preventing an uncontrolled rollback of a motor vehicle, said motor vehicle comprising:
   a motor;
   a transmission that is selected as one of an automated shift transmission and a dual clutch transmission;

at least one controllable clutch transmitting a clutch torque from the motor into the transmission; and a control controlling the clutch torque, said method comprising the method steps:

controlling the engagement of the at least one controllable clutch for controlling the clutch torque;

controlling the clutch torque such that in case a rollback is detected, said rollback being a movement in opposite direction as a predetermined direction of movement of the motor vehicle having disengaged brakes, a clutch torque is transmitted via the clutch, said clutch torque acting against the rollback direction;

increasing the clutch torque with increasing rollback speed when a first rollback speed is exceeded up to a maximum clutch torque at a second rollback speed that is higher than the first rollback speed;

limiting the clutch torque to the maximum clutch torque for any rollback speeds exceeding the second rollback speed; and regulating down the clutch torque such that a predetermined creeping speed in the predetermined direction of movement is not exceeded as long as no starting mode has been chosen.

2. The method for preventing an uncontrolled rollback according to claim 1, further comprising the method step of transmitting a constant reduced clutch torque in comparison to the maximum value via the drive train over a partial range that comprises the rollback speed zero.

3. The method for preventing an uncontrolled rollback according to claim 2, further comprising the method step of applying a further reduced clutch torque in a breaking mode.

4. The method for preventing an uncontrolled rollback according to claim 2, further comprising the method step of controlling a further reduced clutch torque in a breaking mode by the braking pressure.

5. The method for preventing an uncontrolled rollback according to claim 1, further comprising the method step of varying the rotational speed of the motor in a predetermined range for influencing the clutch torque.

6. The method for preventing an uncontrolled rollback according to claim 1, further comprising the method step of increasing the rotational speed of the motor if a releasing of the brake is detected.

7. The method for preventing an uncontrolled rollback according to claim 1, further comprising the method step of increasing the rotational speed of the motor if a rollback action is detected.

8. The method for preventing an uncontrolled rollback according to claim 1, further comprising the method step of increasing the rotational speed of the motor if a releasing of the brake and a rollback action are detected.

9. A motor vehicle comprising:

a motor;

a transmission that is selected as one of an automated shift transmission and a dual clutch transmission;

a clutch transmitting a clutch torque from the motor into the transmission; and a control for controlling the clutch torque;

a sensor for detecting a rotational direction and a rotational speed for determining a rollback, a rollback speed and a creeping speed; and a control configured such that:

the clutch torque is controlled in case a rollback speed is detected, said rollback being a movement in opposite direction as a predetermined direction of movement of the motor vehicle having disengaged brakes, wherein an additional clutch torque is transmitted acting against the rollback direction;

the clutch torque is increased with increasing rollback speed when a first rollback speed is exceeded up to a maximum clutch torque at a second rollback speed that is higher than the first rollback speed and the clutch torque is limited to the maximum clutch torque for any rollback speeds exceeding the second rollback speed; and the clutch torque is regulated down such that the predetermined creeping speed in the predetermined direction of movement is not exceeded as long as no starting mode has been chosen.

10. The motor vehicle according to claim 9, further comprising at least one device for increasing an idle rotational speed.

\* \* \* \* \*